United States Patent [19]
Tebbetts, Jr.

[11] 3,948,518
[45] Apr. 6, 1976

[54] FOOTBALL

[75] Inventor: Herbert E. Tebbetts, Jr., Huntington Beach, Calif.

[73] Assignee: AMF Incorporated, White Plains, N.Y.

[22] Filed: Dec. 13, 1974

[21] Appl. No.: 532,379

Related U.S. Application Data

[62] Division of Ser. No. 325,572, Jan. 22, 1973, Pat. No. 3,887,416.

[52] U.S. Cl. .......................... 273/65 EG; 273/65 EC
[51] Int. Cl.² .......................................... A63B 41/00
[58] Field of Search ......... 273/65 EG, 58 B, 58 BA, 273/65 EC

[56] References Cited
UNITED STATES PATENTS

| | | | |
|---|---|---|---|
| 2,653,818 | 9/1953 | Tebbetts | 273/65 EG |
| 3,475,027 | 10/1969 | Henderson | 273/65 EG |
| 3,508,750 | 4/1970 | Henderson | 273/65 EG |
| 3,512,777 | 5/1970 | Henderson | 273/65 EG |

Primary Examiner—George J. Marlo
Attorney, Agent, or Firm—George W. Price; Walter Lewis

[57] ABSTRACT

A football including a wound bladder, a rubber layer including seams, and leather panels having square edges abutting the sides of the seams. The rubber layer has a thickness which gradually increases from a minimum midway of the seams to a maximum at the seams. The rubber layer is formed from spaced apart filler members positioned on the wound bladder prior to an operation in which the seams are molded.

1 Claim, 15 Drawing Figures

FIG. 11
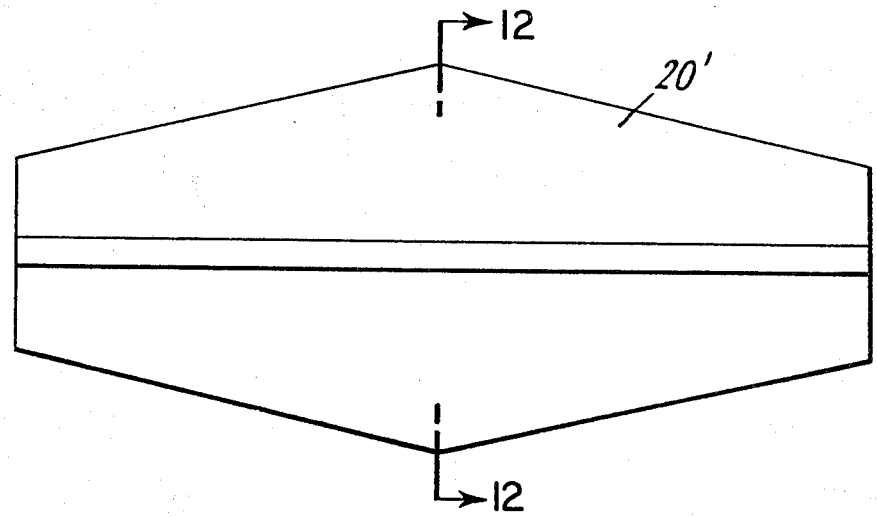
FIG. 12 FIG. 13 FIG. 14
 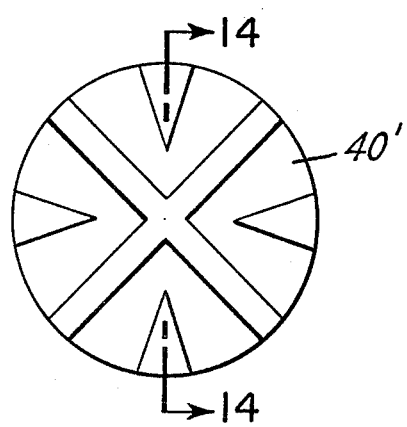 

FOOTBALL

BACKGROUND

This application is a division of my copending application Ser. No. 325,572 filed Jan. 22, 1973, now U.S. Pat. No. 3,887,416, granted June 3, 1975.

This invention relates to a football and method of manufacture, and more specifically to a football made predominently from rubber or like materials and having the shape and characteristics of sewn leather footballs, and the method of manufacture thereof.

Footballs generally used in official competition such as the professional leagues and intercollegiate and interscholastic competition comprise an inflatable inner bladder made of butyl rubber or the like and a sewn leather carcass mounted therearound that is formed by sewing several leather panels together. Such footballs have been used in official competition for a long time primarily because the players prefer the shape and "feel" that sewn leather imparts to the football as well as the flight characteristics thereof when the football is thrown.

This shape is a "square" shape, that is, the circumference of the ball is not a perfect surface of revolution but the radius of the ball is greater adjacent the sewn seams due to the sewing together of the panels. This gives the predetermined "feel" to the ball that players find preferable for holding and throwing. In addition, the bunching of the leather at the ends of the football when the panels are sewn together gives predetermined flight characteristics to the ball when thrown as well as certain bounce characteristics.

However, sewn leather footballs are impractical and expensive, both from the cost standpoint in material and in the labor needed to sew the panels together, and in the fact that they tend to deteriorate rapidly both in structural integrity and in the loss of the "square" shape that is one of the primary reasons for using the leather ball. This loss of the "square" shape is due to the tendency of the rubber inner bladder to expand in a spherical manner and distend the leather panels between the seams, forcing the "squareness" out and roundness into the ball. This necessitates frequent replacement of the sewn leather ball.

Accordingly, in non-league and playground play, where costs are paramount, footballs made of rubber, vinyl or the like have replaced sewn leather footballs. While these footballs are much more durable than sewn leather footballs, they are generally made round in cross-section and they do not have the "feel" and flight characteristics that players have come to expect and desire in footballs.

Attempts have been made previously to approximate the feel and flight characteristics of sewn leather footballs. In the inventor's previous U.S. Pat. No. 2,653,818, raised seams were provided in a football for ease of gripping and to simulate the shape and feel of a sewn leather ball. This ball proved unsatisfactory since raising the seam a small amount was ineffective and raising them substantially in the manner shown affected the bounce characteristics of the ball.

Similarly, attempts have been made previously to provide a rubber football that approximates the action of a sewn leather ball. U.S. Pat. No. 2,219,078 discloses the use of an end member to simulate the action of such a ball when it hits the ground.

However, none of these attempts have successfully provided a football having the durability of rubber and the feel and flight characteristics of a sewn leather football.

SUMMARY

It is, accordingly, an object of this invention to provide an improved football.

It is a more specific object of this invention to provide a football having the characteristics of a sewn leather football and the construction of a rubber football.

It is a still further object of this invention to provide a rubber football having the shape and characteristics of a sewn leather football.

In accordance with these and other objects, a preferred embodiment of a football according to the invention may comprise an ellipsoid shaped bladder, means mounted on the bladder to form seam members thereon, means mounted on the bladder adjacent the seams for enlarging the cross-section of the bladder adjacent thereto, and end members mounted on the bladder and a plurality of cover panels mounted on the bladder between the seams.

DESCRIPTION OF THE DRAWINGS

FIG. 11 shows an alternate embodiment of the side panel element shown in FIGS. 2 and 3.

FIG. 12 is a sectional view of the side panel element shown in FIG. 11, taken along line 12—12 of FIG. 11.

FIG. 13 is an alternate embodiment of the end panel element shown in FIGS. 4 and 5.

FIG. 14 is a sectional view of the end panel element of FIG. 13, taken along line 14—14 of FIG. 13.

DESCRIPTION OF THE PREFERRED EMBODIMENT

With reference to the drawings, a preferred embodiment of a football according to the invention comprises an inner bladder 10 shaped approximately as an ellipsoid surface of revoluton. This inner bladder may be made of butyl rubber or the like and may be reinforced by a layer of geodesic nylon windings 12, such as shown in the assignee's U.S. Pat. No. 3,459,425. Fabric reinforcement or the like may be used as an alternative to geodesic windings.

The bladder 10 is marked with four lines 14 spaced from the longitudinal axis of the ball and equally spaced around the periphery thereof. The marking may be made by hand or by placing the bladder in a cold mold. When reinforcing windings are placed on the ball, a thin layer of rubber or the like 18 (FIG. 10) can be placed thereover and the thus covered ball can be placed in a mold for marking. In the alternative, markings can be placed directly on the windings.

Figure 1:
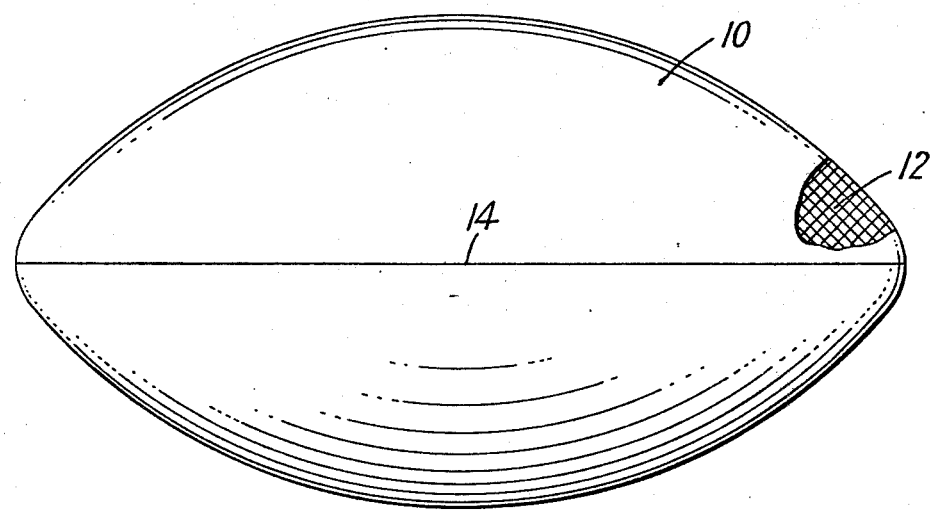
FIG. 1 shows a side view of a reinforced bladder to be used in making a football.
Figure 2:
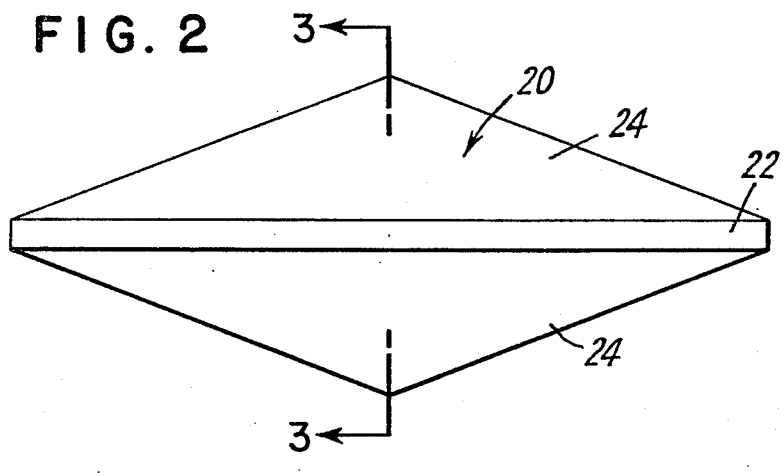
FIG. 2 shows a side panel element to be placed on the reinforced bladder.
Figure 3:
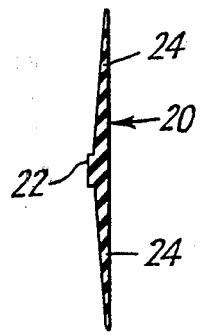
FIG. 3 is a sectional view of the side panel element shown in FIG. 2, taken along line 3—3 of FIG. 2.

Four side panels 20 are then placed on the marked bladder by a suitable adhesive. Three of the panels 20 are such as shown in FIGS. 2 and 3 and include a raised seam portion 22 that is aligned with the marking line 14 on the ball and thickening members 24 on each side of the seam portion 22. The fourth panel 20 is similar to the other three, but does not include a raised seam portion in the middle thereof to allow for lacing, as set forth more fully below.

Another alternative method of placing side panels 20 on the reinforced bladder would be to omit marking lines 14 altogether and locate the side panels by an automatic jig which would place an adhesive backed side panel on the bladder at 90° intervals.

Figure 4:
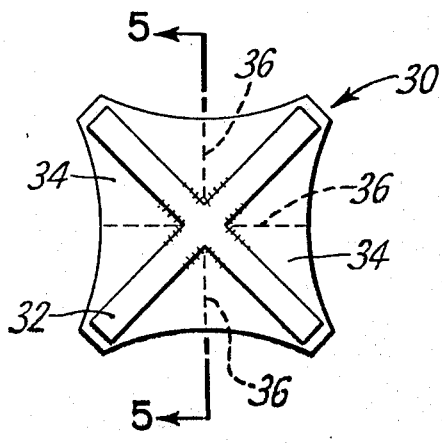
FIG. 4 is an end panel element to be placed on the reinforced bladder shown in FIG. 1.
Figure 5:
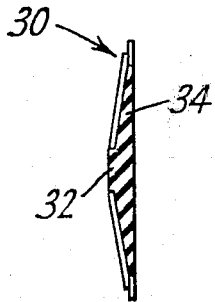
FIG. 5 is a sectional view of the end panel element shown in FIG. 4, taken along line 5—5 of FIG. 4.

A pair of end members 30 (FIGS. 4 and 5) are placed on the reinforced bladder 10 at the ends thereof. Each of the end members 30 includes crossed raised seam portions 32 and connecting portions 34 therebetween. The end members are slit, at 36, so that they may readily be placed on the end of the bladder 10.

In the alternative, the end members may be notched so that they butt when placed on the end of bladder 10. Such an end member is shown in FIGS. 13 and 14 and is designated 40'. The end members are placed on the bladder such that the seam portions 32 thereof are in alignment with the seam portions 22 of the side panels 20. The connecting portions 34 serve to add weight and size to the end of the football.

A plurality of thin filler members 40 are placed on the bladder in between the side panels and end panels placed thereon previously to provide enough rubber over the bladder to add a complete layer thereto as well as to build up the dimension thereof specifically adjacent the seam portions 32 and the ends of the football.

In the alternative, filler members 40 may be eliminated by enlarging the side panels 20 to cover the areas exposed by the present configuration of the side panels. Such enlarged side panel is shown in FIGS. 11 and 12 and designated with numeral 20'.

Figure 6:
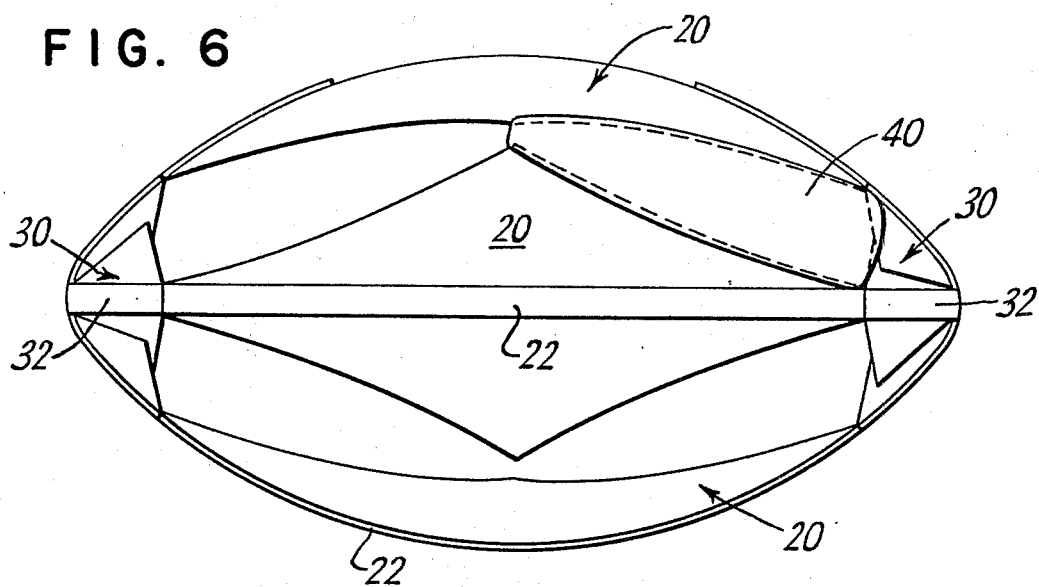
FIG. 6 shows the bladder of FIG. 1 with the elements shown in FIGS. 2-5 placed thereon.
Figure 7:
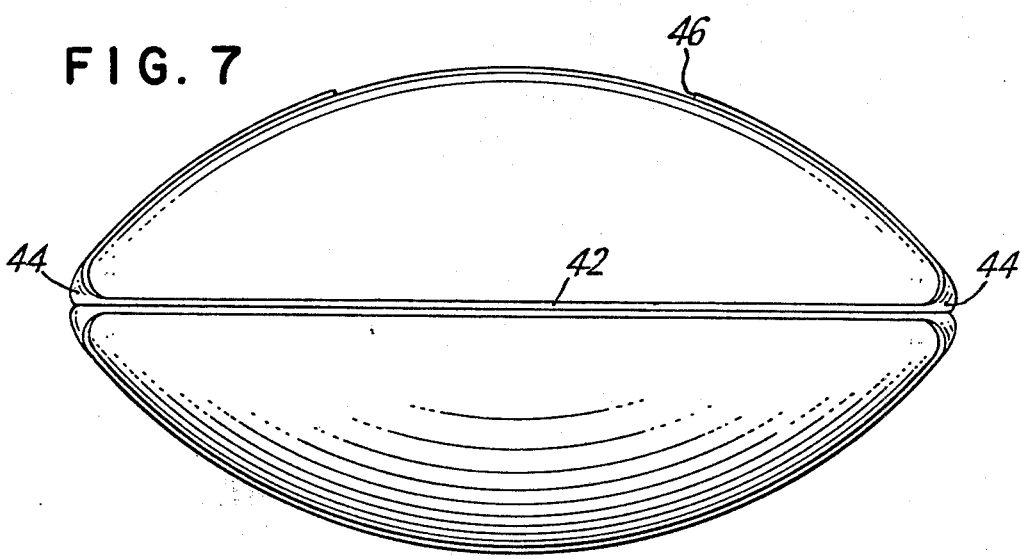
FIG. 7 shows the bladder of FIG. 6 after molding and curing.

The thus covered bladder (FIG. 6) is then placed in a mold to form raised simulated side seams 42 bordering the four longitudinal quadrants of the ellipsoid, the side seams 42 fairing into simulated end seams 44 such as shown in FIG. 7. One of the simulated seams 42 is provided with a gap 46 where lacing will be applied, as set forth below.

Figure 8:
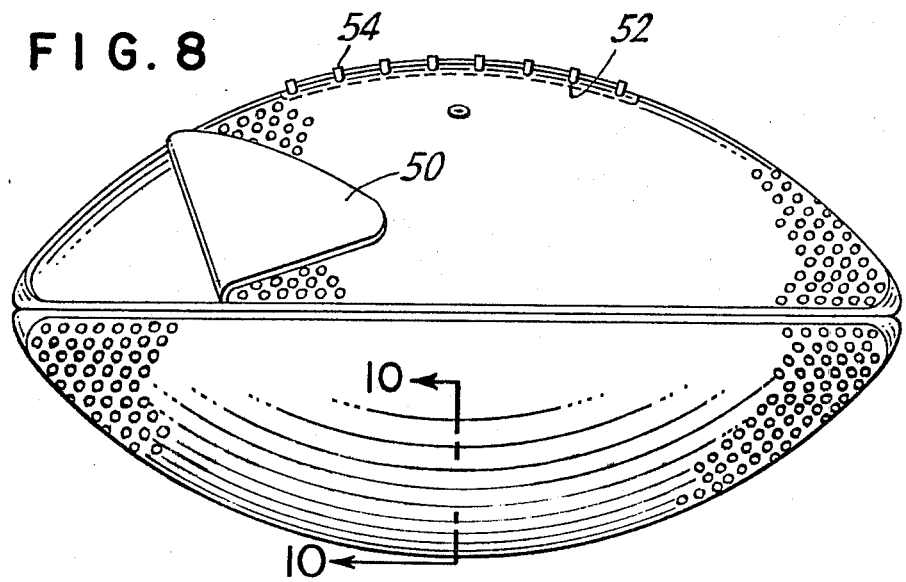
FIG. 8 shows a football formed by placing leather panels between the seams formed on the bladder shown in FIG. 7 and after lacing has been placed thereon.
Figure 9:
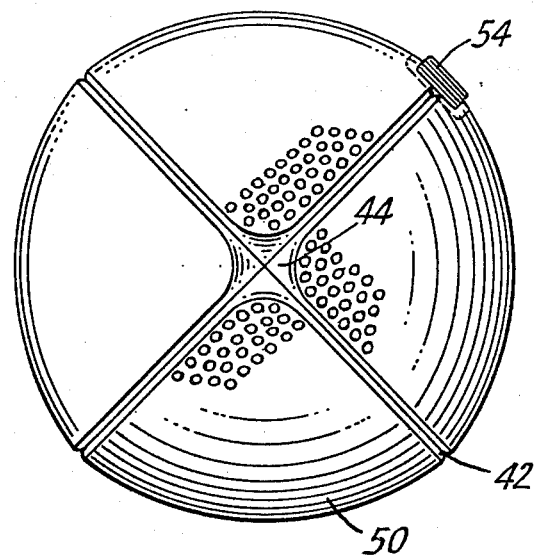
FIG. 9 is an end view of the football shown in FIG. 8.

Leather panels 50 are placed on the ball in between the seams 42 (FIG. 8). The amount that the simulated seams 42 and 44 protrude above the periphery of the formed covered bladder and the thickness of the leather panels are selected such that joints between the panels and the simulated seams 42 and 44 are smooth and present no height differential. The panels 50 can be made of genuine or simulated leather or any other suitable material. The two panels adjacent the simulated seam having the gap 46 are provided with holes 52. Lacing 54 is applied through the holes 52 to finish the ball.

Figure 10:
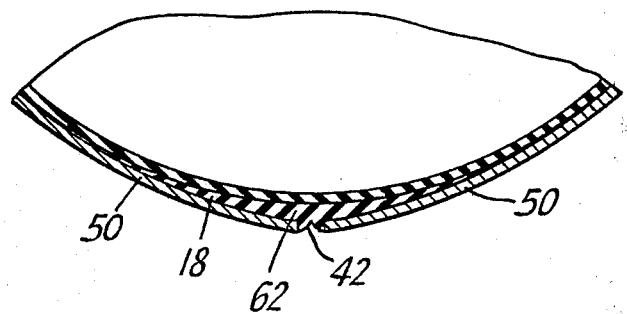
FIG. 10 shows a portion of the football shown in FIG. 8 in section, taken along lines 10—10 of FIG. 8.
Figure 15:
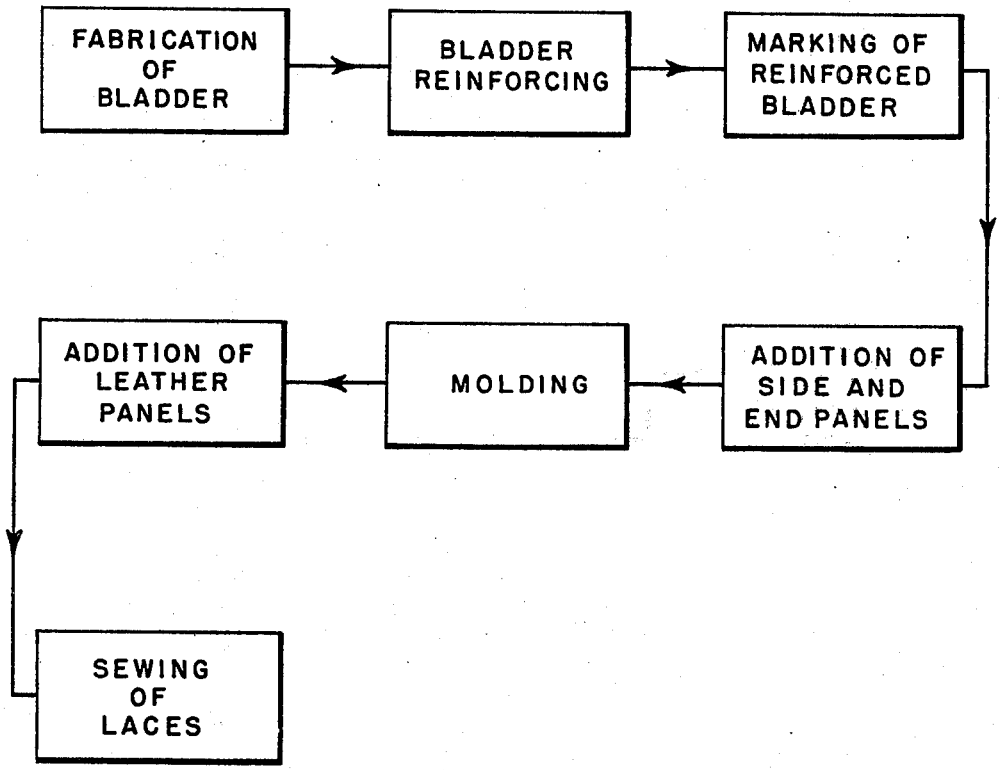
FIG. 15 is a block diagram of a method of making the football shown in FIGS. 1-9.

With reference to FIG. 10, the finished football 60 includes raised portions 62 adjacent the simulated seams 42. These raised portions provided the square shape of sewn leather footballs. Since the raised portions 62 are formed of additional rubber molded to the reinforced bladder above the surface of revolution thereof, this square shape will never be lost. These raised portions 62 are realized from the additional rubber placed on the surface of revolution bladder when the side panels 20 were placed thereon and are shaped by the final mold to that shown in FIG. 10, a gradually increasing buildup from a beginning at approximately the midpoint between the simulated seams to a maximum at (actually under) the simulated seam.

Similarly, there is a buildup at the ends of the football due to the addition of the end members 30 to the surface or revolution bladder. This additional rubber simulates the added weight at the end of a sewn leather football due to the bunching and folding in of the leather panels. Accordingly, the football 60 very closely approximates the bounce and flight characteristics of a sewn leather football.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. A leather panel covered football which simulates the weighted ends, shape, bounce, flight and feel characteristics of a hand sewn leather football, comprising an inner ellipsoid shaped inflated rubber bladder, said bladder having a circular cross section, a cord wound reinforcing layer on said bladder, a layer of rubber on said cord layer, said rubber layer having four integral simulated raised seams which extend lengthwise of the bladder and are equidistantly circumferentially spaced thereof, and four exterior leather panels covering said rubber layer exclusive of said seams whereby said seams space said panels from each other, the edges of said panels being square and abutting said seams and said seams having a height equal to the thickness of said panels, said rubber layer having a thickness which gradually increases in thickness from a minimum midway of said seams to a maximum at said seams, whereby the exterior of said football has an out of round shape in that the outer diameter thereof gradually increases from a minimum midway of said seams to a maximum at said seams, whereby said football has inherent weighted ends and the shape, bounce, flight and feel characteristics of a hand sewn leather football.

* * * * *